T. J. KEHOE.
HINGE.
APPLICATION FILED OCT. 19, 1914.

1,157,006.

Patented Oct. 19, 1915.

WITNESSES:-
R. G. Allen.
E. E. Thomas.

INVENTOR.
Thomas J. Kehoe,
By Owen, Owen & Crampton
His attys

UNITED STATES PATENT OFFICE.

THOMAS J. KEHOE, OF TOLEDO, OHIO.

HINGE.

1,157,006.  Specification of Letters Patent.  Patented Oct. 19, 1915.

Application filed October 19, 1914. Serial No. 867,500.

*To all whom it may concern:*

Be it known that I, THOMAS J. KEHOE, a citizen of the United States, and a resident of Toledo, in the county of Lucas and State of Ohio, have invented a certain new and useful Hinge; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to door hinges and particularly to hinges of the concealed type for use in connection with automobile doors or the like.

The object of my invention is the provision of a hinge of this character which is simple and inexpensive to manufacture, strong and durable in its construction, and capable of having the members thereof easily and quickly applied to a door and its casing and almost entirely concealed by the customary interior upholstering in an automobile body.

A further object of the invention is the provision of simple and improved means for rendering the members of a hinge of this nature easily and quickly separable to facilitate the hanging of automobile and other doors and minimizing the work incident thereto.

The invention is fully described in the following specification, and while, in its broader aspect, it is capable of embodiment in numerous forms, a preferred embodiment thereof is illustrated in the accompanying drawings, in which,—

Figure 1:
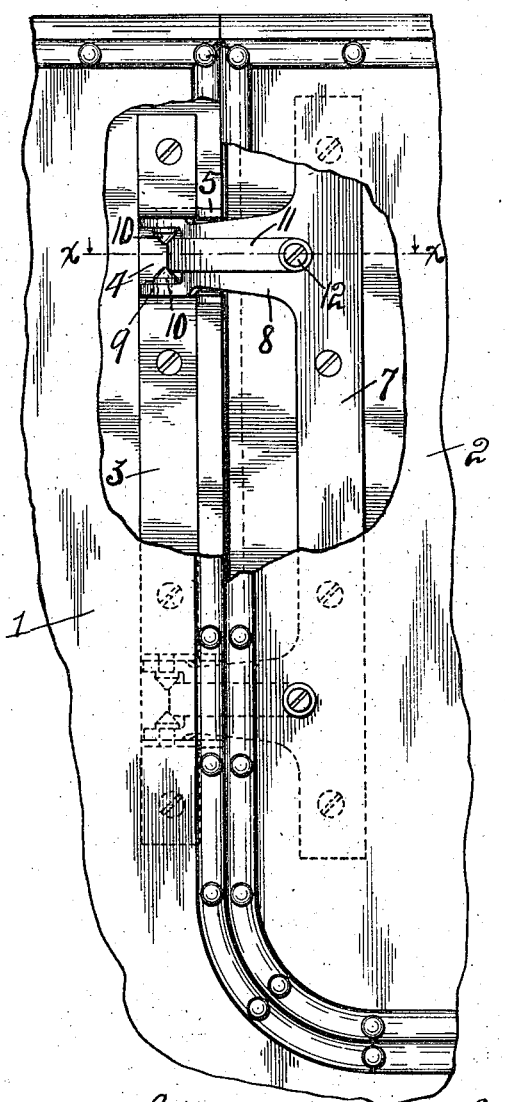
Figure 2:
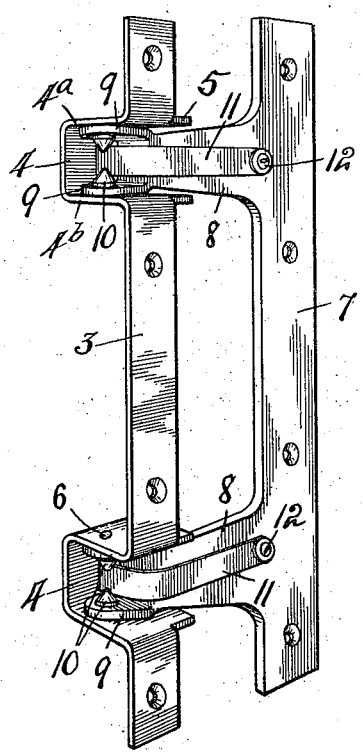
Figure 3:
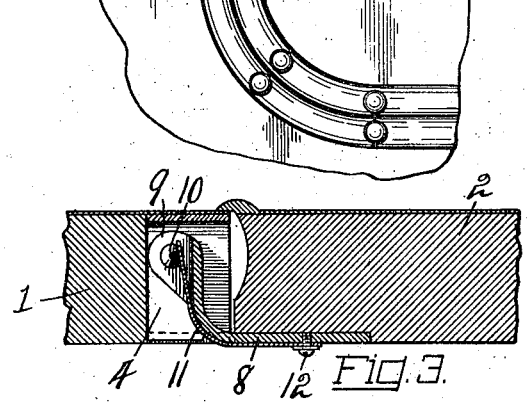
Figure 4:
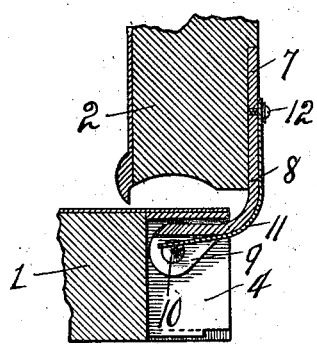

Figure 1 is an interior elevation of a hinge embodying my invention in operative association with the door and casing of an automobile body, a portion of the upholstering being broken away to disclose the hinge. Fig. 2 is a perspective view of the hinge members in closed relation. Fig. 3 is a cross-section on the line $x$, $x$ in Fig. 1, and Fig. 4 is a similar cross-section with the door swung to open position.

Referring to the drawings, 1 designates the door frame or casing of an automobile body, and 2 a door mounted therein.

The female member of the hinge employed comprises, in the present instance, a plate or bar 3, which is intended to be secured by means of screws, or in any other suitable manner, to the inner side of the automobile body adjacent to the door receiving opening therein. This member is provided, in the present instance, with a pair of vertically spaced socket portions 4, which are preferably formed by transversely looping the bar or plate 3 so as to provide each socket with vertically spaced upper and lower walls $4^a$ and $4^b$, respectively. The socket portions 4 of the female member fit into registering recesses provided in the wall of the door casing. If the bar or plate 3 is set back or spaced from the edge of the casing, which forms the door opening, the socket portions 4 are broadened relative to the bar 3, as shown at 5, to enable them to project to the edge of the casing and open into the door receiving opening thereof. The upper and lower walls $4^a$ and $4^b$ of the socket portions 4 are provided with axially registering pintle receiving openings 6. The plate or bar 3 is intended to face the interior of the automobile body and has its sockets 4, 4 open both at the front and at the side thereof adjacent to the door receiving opening.

The male member of the hinge preferably comprises a bar or plate 7 adapted to be secured by screws, or in any other suitable manner, to the inner side of the door 2 adjacent to the rear edge thereof. The bar or plate 7 is provided with hinge arms or projections 8 corresponding in number to and positioned to register with the respective socket portions 4 of the female member. Each arm 8 is of L-form with its free end portion extending outwardly relative to the door transverse the rear edge portion thereof and in spaced relation thereto, thus enabling the free angled end of the arm to project into the registering socket 4 of the female member. The arms 8 are provided at their upper and lower edges adjacent to their free ends with ears 9, which, in the present instance, project from the arm in opposition to the door 2 and have axially registering openings, which, when the door is in closed position, stand in axial register with the openings 6 in the upper and lower walls of the socket portions 4.

A pintle or pivot stud 10, which is headed at one end, is inserted outwardly through the opening in each ear 9 and into the registering openings 6 in the socket member and coöperates with the other pintles to hingedly connect the hinge members. The headed ends of the pintles limit their outward movement in the openings into which they are inserted and are preferably of conical form, but may be of any other suitable shape as desired.

The pintles 10 associated with each arm 8 are secured in assembled or member-connecting position by means of a spring finger 11, which has one end projected between the ears 9 of an arm 8 and bearing outwardly against the heads of the associated pintles, while its other end is bent around the angle of the arm and is fixedly secured to the arm adjacent to its inner end, as by a screw 12. The bending of the spring finger 11 around the arm 8 causes the free end portion of the finger to have a firm outward spring thrust against the heads of both the associated pintles 10, so as to prevent any rattling thereof and to retain them in assembled or member-connecting position. When it is desired to disconnect the hinge members to remove the door from the body for any purpose, the screws 12, which secure the spring fingers 11 to the arms 8, are removed, thus permitting a removal of the spring fingers from locking engagement with the pintles and a removal of the pintles from member-connecting position. When the interior of an automobile body and its doors have been upholstered the hinge members are hidden from view, except when the door is opened, and then only the outer end portions of the hinge arms 8 and the outer ends of the socket portions 4 are exposed.

With the form of hinge described the opening movements of the door are limited by reason of transversely extending portions of the arms 8 coacting with the outer edge of the rear wall of the socket portions 4, as indicated in Fig. 4.

It is found in practice that my improved hinge is capable of being easily and quickly applied to a door and its casing, and that the members of the hinge can be easily and quickly separated or connected as the hanging and fitting of the door and casing may require.

I wish it understood that my invention is not limited to any specific construction, arrangement or form of the parts except in so far as such limitations are specified in the claims.

Having thus described my invention, what I claim as new, and desire to secure by Letters Patent, is,—

1. A hinge having interengaging male and female members, pintles pivotally connecting said members in interengaging relation, and means removably secured to and carried by one of said members and coacting with said pintles to retain them in member-connecting position.

2. A hinge having interengaging male and female members, pintles pivotally connecting said members in interengaging relation, and a spring finger removably secured to one of said members and coacting with said pintles to retain the same in assembled relation.

3. A hinge having interengaging male and female members, the male member being of L-form and having ears projecting from a part thereof, pintles pivotally connecting said ears and the female member, and a spring finger removably secured to the male member and engaging said pintles to secure them in assembled relation.

In testimony whereof I have hereunto signed my name to this specification in the presence of two subscribing witnesses.

THOMAS J. KEHOE.

Witnesses:
E. E. THOMAS,
F. E. AUL.